(12) United States Patent
Kang

(10) Patent No.: US 8,594,926 B2
(45) Date of Patent: Nov. 26, 2013

(54) METHOD FOR GUIDING CROSSROAD USING POINT OF INTEREST AND NAVIGATION SYSTEM

(75) Inventor: Jung Min Kang, Seoul (KR)

(73) Assignee: Thinkware Systems Corporation, Seoul (KR)

( * ) Notice: Subject to any disclaimer, the term of this patent is extended or adjusted under 35 U.S.C. 154(b) by 802 days.

(21) Appl. No.: 12/601,224

(22) PCT Filed: Dec. 13, 2007

(86) PCT No.: PCT/KR2007/006503
§ 371 (c)(1),
(2), (4) Date: Nov. 20, 2009

(87) PCT Pub. No.: WO2008/147006
PCT Pub. Date: Dec. 4, 2008

(65) Prior Publication Data
US 2010/0174481 A1  Jul. 8, 2010

(30) Foreign Application Priority Data
May 28, 2007 (KR) .................. 10-2007-0051462

(51) Int. Cl.
*G08G 1/123* (2006.01)
(52) U.S. Cl.
USPC ..................... 701/438; 340/995.19
(58) Field of Classification Search
USPC ......... 701/426, 532, 533, 410, 454, 527, 400; 340/995.1, 995.16, 995.19, 995.23, 340/995.27
See application file for complete search history.

(56) References Cited

U.S. PATENT DOCUMENTS

| | | | |
|---|---|---|---|
| 7,920,968 B2* | 4/2011 | Chapin et al. | 701/426 |
| 2004/0054687 A1* | 3/2004 | McDonough | 707/104.1 |
| 2007/0032943 A1* | 2/2007 | Okabe | 701/200 |
| 2007/0078596 A1 | 4/2007 | Grace | |

FOREIGN PATENT DOCUMENTS

| | | |
|---|---|---|
| EP | 0837434 | 4/1998 |
| JP | 09-152354 | 6/1997 |
| JP | 2004138394 | 5/2004 |
| JP | 2004205405 | 7/2004 |
| JP | 2004251701 | 9/2004 |
| JP | 2005249485 | 9/2005 |
| JP | 2006329678 | 12/2006 |

OTHER PUBLICATIONS

Patent Cooperation Treaty, "International Search Report and Written Opinion", ISA/KR, by Officer Lee Hyeon Hong in PCT Application No. PCT/KR07/006503; Document of 7 pages dated Mar. 21, 2008.
European Patent Office, "Supplementary European Search Report", in EP Application No. 07851474.2; PCT Application No. PCT/KR2007/006503; Place of search The Hague; Document of 7 pages dated Mar. 16, 2011.

* cited by examiner

*Primary Examiner* — Khoi Tran
*Assistant Examiner* — Luke Huynh
(74) *Attorney, Agent, or Firm* — Saliwanchik, Lloyd & Eisenschenk

(57) ABSTRACT

An intersection guidance method using Point of Interest (POI) information and a navigation system are provided. An intersection guidance method using POI information, the intersection guidance method including: retrieving a route to a destination set by a user and providing guidance about the route; providing, when an intersection is sensed on the route, guidance about a turn in the intersection using surrounding POI information of the intersection.

13 Claims, 4 Drawing Sheets

METHOD FOR GUIDING CROSSROAD USING POINT OF INTEREST AND NAVIGATION SYSTEM

TECHNICAL FIELD

The present invention relates to a navigation system, and more particularly, to an intersection guidance method and navigation system using Point of Interest (POI) information to provide improved guidance about a turn in an intersection.

BACKGROUND ART

A navigation system is a system which provides information for driving of a transportation device, such as a vehicle, using an artificial satellite. The navigation system is automatic.

The navigation system receives predetermined data from a Global Positioning System (GPS) satellite above the Earth using a GPS receiver, and calculates its own location based on the received data.

The navigation system may provide a user with information about a current location of a vehicle based on calculated location information, perform routing to calculate a route to a desired destination, and provide guidance about the route.

The navigation system stores geographic data and POI information about an entire map. The POI information includes information about a building, road, and the like on the map. The navigation system uses the stored geographic data and POI information as information for route guidance.

That is, the navigation system receives a signal including latitude and longitude information from GPS satellites, and calculates and outputs a user location. Also, the navigation system map-matches the user location with geographic data, and thereby may provide guidance about a route to a desired destination from a current location.

Currently, more and more roads are extended and built due to the increase in vehicles, and the number of intersections with a plurality of on-ramps increases. When such an intersection exists on a route, information about an exit direction and entry direction in an intersection may be displayed as an image on geographic data, and voice guidance about an entry direction based on a distance may be provided.

However, in an intersection guidance method in a conventional art, guidance about a turn in an intersection is provided using a distance based on a current location, for example, 'turn right 500 m ahead.'. Accordingly, when a user may not reliably and accurately determine a distance, or is not familiar with distance estimation, the user may not be able to determine an entry point in an intersection.

When a number of roads exist or on-ramps are situated in a complex manner in an intersection, a user may be confused about on-ramps or pass an on-ramp, which may prevent a user from driving safely.

Also, in a method of providing guidance about a turn in an intersection based on distance, since a location of a guidance point may be different in each navigation service providing guidance about a route, a user is required to reacquaint himself/herself with a guidance distance, which is inconvenient for a user.

DISCLOSURE OF INVENTION

Technical Goals

The present invention provides an intersection guidance method using Point of Interest (POI) information, and also provides a navigation system which may provide improved guidance about a route to enable a user to take a turn in an intersection more safely and reliably.

The present invention also provides an intersection guidance method using POI information, and also provides a navigation system to improve turn guidance information using POI information around an intersection.

Technical Solutions

According to an aspect of the present invention, there is provided an intersection guidance method using Point of Interest (POI) information, the intersection guidance method including: retrieving a route to a destination set by a user and providing guidance about the route; providing, when an intersection is sensed on the route, guidance about a turn in the intersection using surrounding POI information of the intersection.

According to another aspect of the present invention, there is provided a navigation system, including: a database including an ID for each intersection, possible turning direction in each intersection, and ID for each representation POI with respect to each turning direction; and a control unit, when an intersection is retrieved on a route set by a user, recognizing a turning direction in the intersection based on the route, reading a representation POI with respect to the turning direction from the database, and providing guidance about the turning direction in the intersection based on the representation POI.

According to the present invention, an intersection guidance method using POI information and navigation system provides a particular POI around an intersection with information about a turning direction and representation, and thereby may provide guidance about a turn in the intersection using the POI information corresponding to the turning direction.

BEST MODE FOR CARRYING OUT THE INVENTION

Hereinafter, embodiments of the present invention are described in detail by referring to the figures.

First, a configuration of a navigation system according to an exemplary embodiment of the present invention is described.

Figure 1:
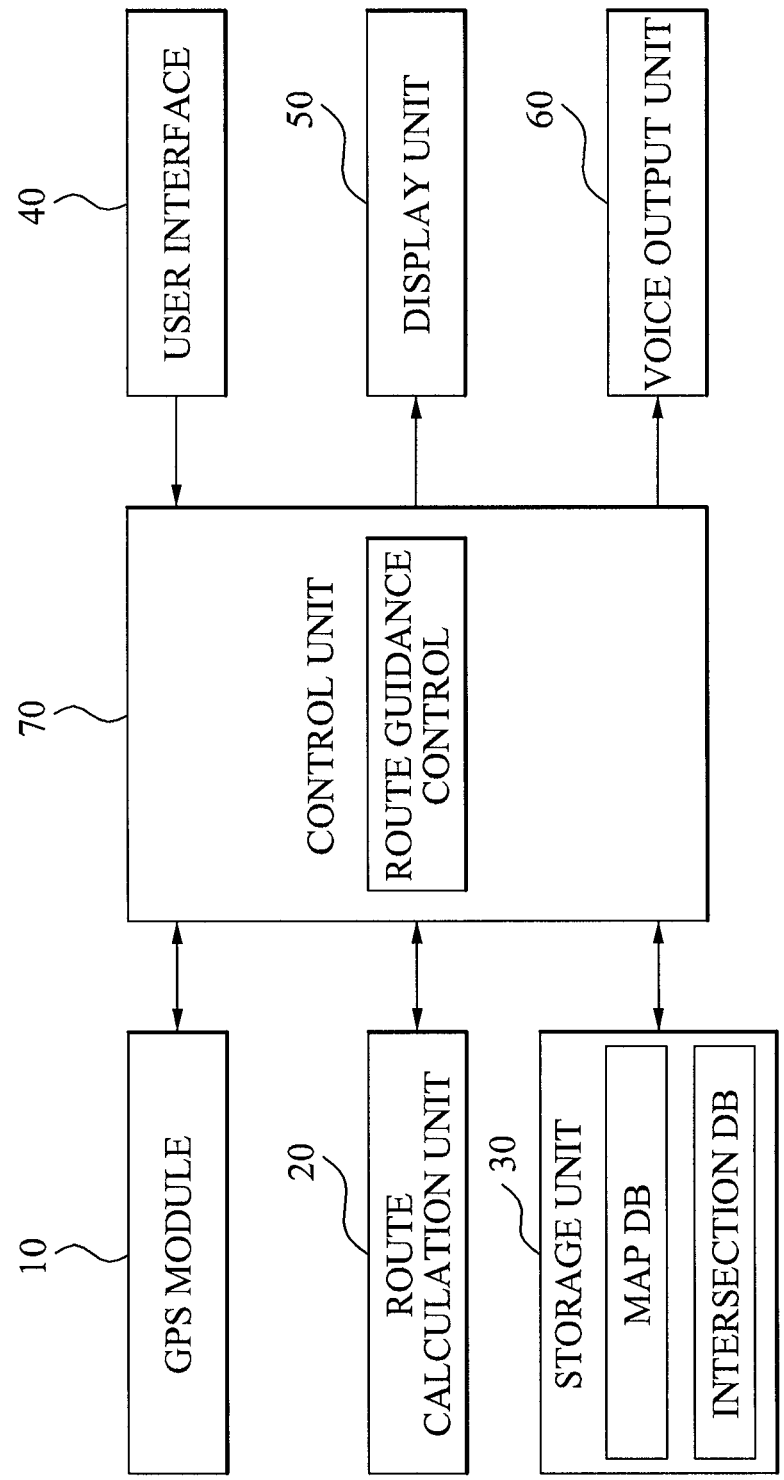
FIG. 1 is a diagram illustrating a configuration of a navigation system according to an embodiment of the present invention.

FIG. 1 is a diagram illustrating a configuration of a navigation system according to an embodiment of the present invention.

According to an embodiment of the present invention, the navigation system includes a Global Positioning System (GPS) module 10. The GPS module 10 receives a location signal from at least three GPS satellites, and calculates its own location.

The navigation system is a user terminal providing guidance about a route to a destination set by a user. In particular, the navigation system may provide guidance about a turn in an intersection using Point of Interest (POI) information when providing guidance about an intersection on the route.

As illustrated, the navigation system includes a route calculation unit 20, storage unit 30, user interface 40, display unit 50, voice output unit 60, and control unit 70.

The storage unit 30 includes a map database including map data of a national map and route guidance data associated with the map data. Also, the storage unit 30 stores a control program to control an entire operation of the navigation system including a route guidance function and turn guidance function with respect to an intersection when providing guidance about a route.

In the turn guidance in the intersection, a turning direction in the intersection is provided using a surrounding POI. For this, a database for representation POI information of the intersection, hereinafter, an intersection database, is required to be established. It is preferable that a POI existing in a location where the user may easily recognize based on a turning direction in the intersection may be designated as a representation POI from among a plurality of POIs existing around the intersection, and the intersection database is established.

The intersection database may be included in the storage unit 30. The intersection database includes intersections in the national map, possible turning directions for each intersection, and representation POIs of each turning direction for each intersection.

The turning direction of the intersection is a driving course for each intersection where the user may drive under traffic regulations. Also, the turning direction includes at least one of a left turn, a right turn, a U-turn, a P-turn, and a circular turn. The representation POI is designated based on each possible driving course for each intersection, and inputted in the intersection database. A prohibited driving course is not inputted in the intersection database.

Figure 2:
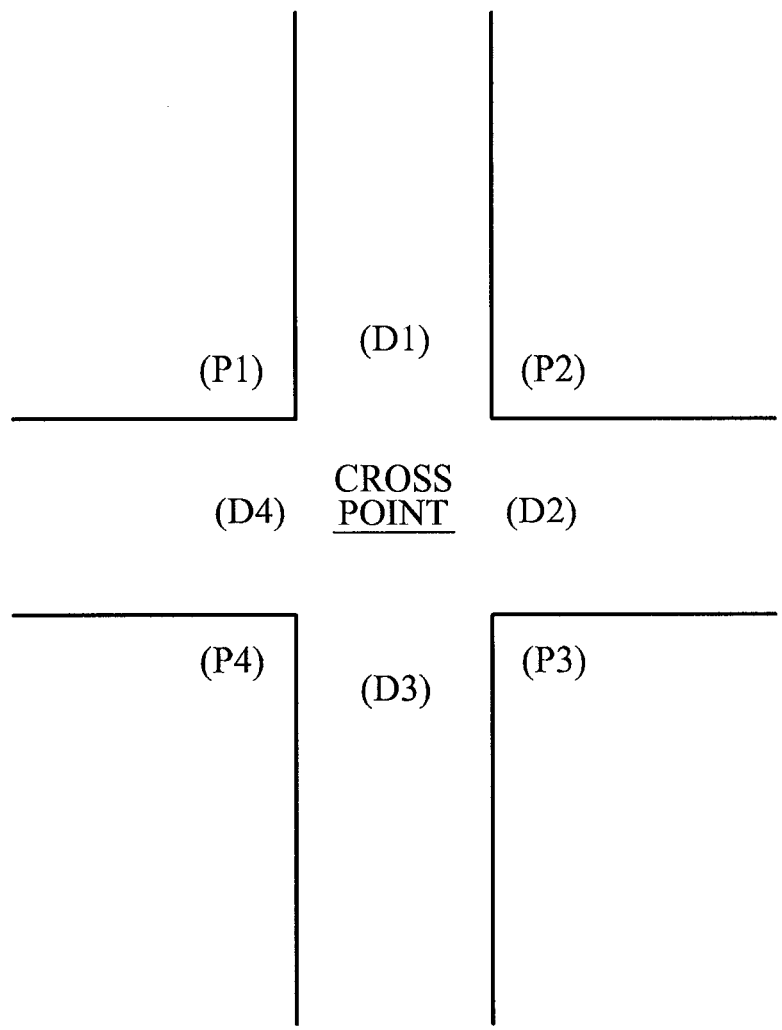
FIG. 2 is a diagram illustrating an example of roads of a possible turning direction in an intersection, and a representation Point of Interest (POI) designated for each turning direction according to an embodiment of the present invention.

FIG. 2 is a diagram illustrating an example of roads of a possible turning direction in an intersection, and a representation POI designated for each turning direction according to an embodiment of the present invention.

For example, when a cross point includes four roads D1, D2, D3, and D4, four representation POIs P1, P2, P3, and P4 may be designated. The representation POI P2 is associated with a turning direction between the road D1 and road D2, representation POI P3 is associated with a turning direction between the road D2 and road D3, representation POI P4 is associated with a turning direction between the road D3 and road D4, and representation POI P1 is associated with a turning direction between the road D4 and road D1.

Also, a turning direction from the road D1 to the road D2 may be set differently from a turning direction from the road D2 to the road D1. A representation POI with respect to a turning direction among the other roads may be set differently.

The representation POI may be a POI located in a place a user may easily recognize while driving in an arbitrary turning direction, or in a place a user may easily recognize when the user is within a predetermined distance.

When a right turn and left turn are possible in the intersection and the road D3 is a start point, and when turning left from the road D3 to the road D4, the representation POI P4 is used, and when turning right from the road D3 to the road D2, the representation POI P3 is used. In this instance, the road D3 corresponding to the start point may be an exit point, and the road D4 and road D2 corresponding to a destination of the turning direction may be an entry point.

Accordingly, the possible turning direction for each intersection is defined, and an exit point and entry point for each turning direction and representation POI are designated and inputted in the intersection database.

It is preferable that an identification (ID) is provided to the intersection and representation POI of each intersection and stored based on information update. An ID table of the intersection database is updated, and thus information about each intersection and representation POI may change.

As shown in Table 1, the intersection database includes the ID for each intersection, exit point and entry point with respect to each of the turning directions for each intersection, and ID for each representation POI previously designated with respect to each of the turning directions.

TABLE 1

Intersection ID
Exit point
Entry point
Representation POI ID

A representation POI based on a turning direction of a corresponding intersection may be recognized using the intersection ID, entry point and exit point stored in the intersection database. Also, guidance about a turn in an intersection may be provided using the recognized representation POI.

The route calculation unit 20 ascertains a current location of a user using a GPS signal received through the GPS module 10, and then retrieves a route from the current location to the destination set by the user from map data, stored in the map database of the storage unit 30, and generates route information.

The control unit 70 provides guidance about the route based on route information generated in the route calculation unit 20. When approaching the intersection on the route, the control unit 70 provides guidance about the turn in the intersection using POI stored in the intersection database of the storage unit 30.

Also, the display unit 50 displays map information for the route guidance and a variety of contents according to each system operation. A Liquid Crystal Display (LCD) or Electro Luminescence (EL) display may be used as the display unit 50.

The user interface 40 is for inputting a user command with respect to a route guidance function, for example, inputting a destination. The user interface 40 may be a touch pad formed integrally with the display unit 50, and provides a user graphic interface unit. Every menu environment associated with the route guidance function of the route guidance system may be provided as a graphic screen through the display unit 50. A user command may be inputted by touching a particular location on the graphic screen using a stylus pen, fingers, and the like.

The voice output unit 60 provides voice guidance about the route. Specifically, the voice output unit 60 provides voice guidance about the route and representation POI corresponding to a turning direction in the intersection.

Figure 3:
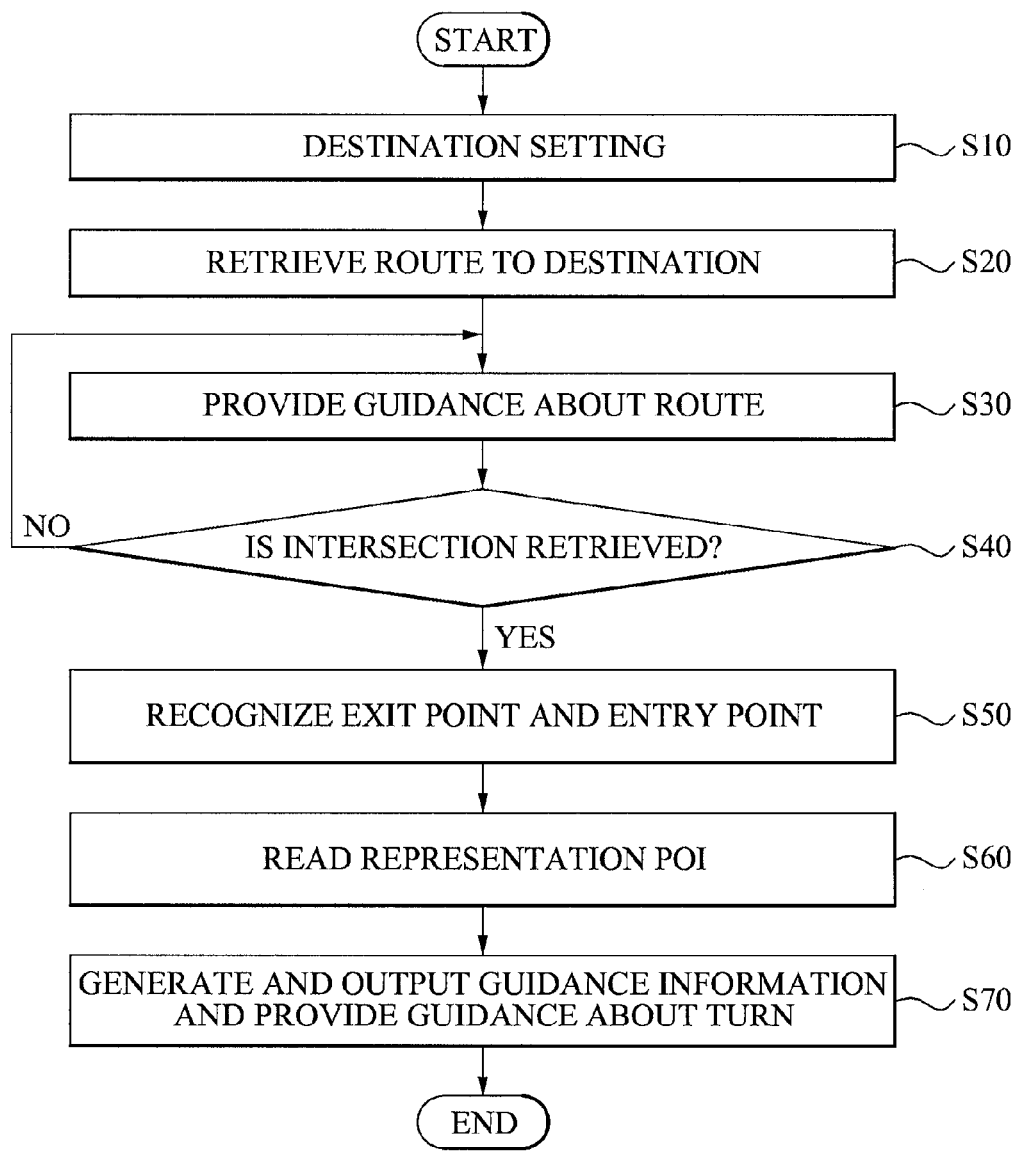
FIG. 3 is a flowchart illustrating an intersection guidance method using POI information according to an embodiment of the present invention.

An intersection guidance method using POI information according to an embodiment of the present invention is described in detail with reference to FIG. 3.

In operation S10, a user executes a user menu for destination setting, and sets a destination with respect to a route guidance function through the user menu.

In operation S20, when a route guidance service with respect to the set destination is requested, a current location of the user is calculated based on a location signal received through a GPS module 60. Also, in operation S20, a route to the destination from the calculated current location is retrieved.

In operation S30, a map screen and voice guidance with respect to the route is provided for route guidance to enable the user to drive according to the retrieved route.

In operation S40, while providing guidance about the route to the destination, an intersection located ahead in a driving direction is retrieved at regular intervals. For the intersection retrieval, it is determined whether a coordinate value of the intersection located a predetermined distance ahead from the current location, that is, a cross point, exists by referring to map data and intersection location information. The map data is stored in the map database.

When the intersection located the predetermined distance ahead is sensed in operation S40, a turning direction in the intersection based on the driving direction on the route is recognized in operation S50. Also, in operation S50, an exit point and entry point of the intersection in the turning direction are recognized.

In operation S60, a representation POI corresponding to the exit point and entry point of the intersection is read by accessing information about the intersection using an ID for each intersection. The ID for each intersection is stored in an intersection database.

In operation S70, guidance information about the intersection is generated using the read representation POI. Also, the generated guidance information is outputted and guidance about a turn in the intersection may be provided in operation S70.

According to the guidance about the turn in the intersection, the read representation POI may be displayed differently from other POIs of a map screen, voice guidance about the route and representation POI may be provided.

Figure 4:
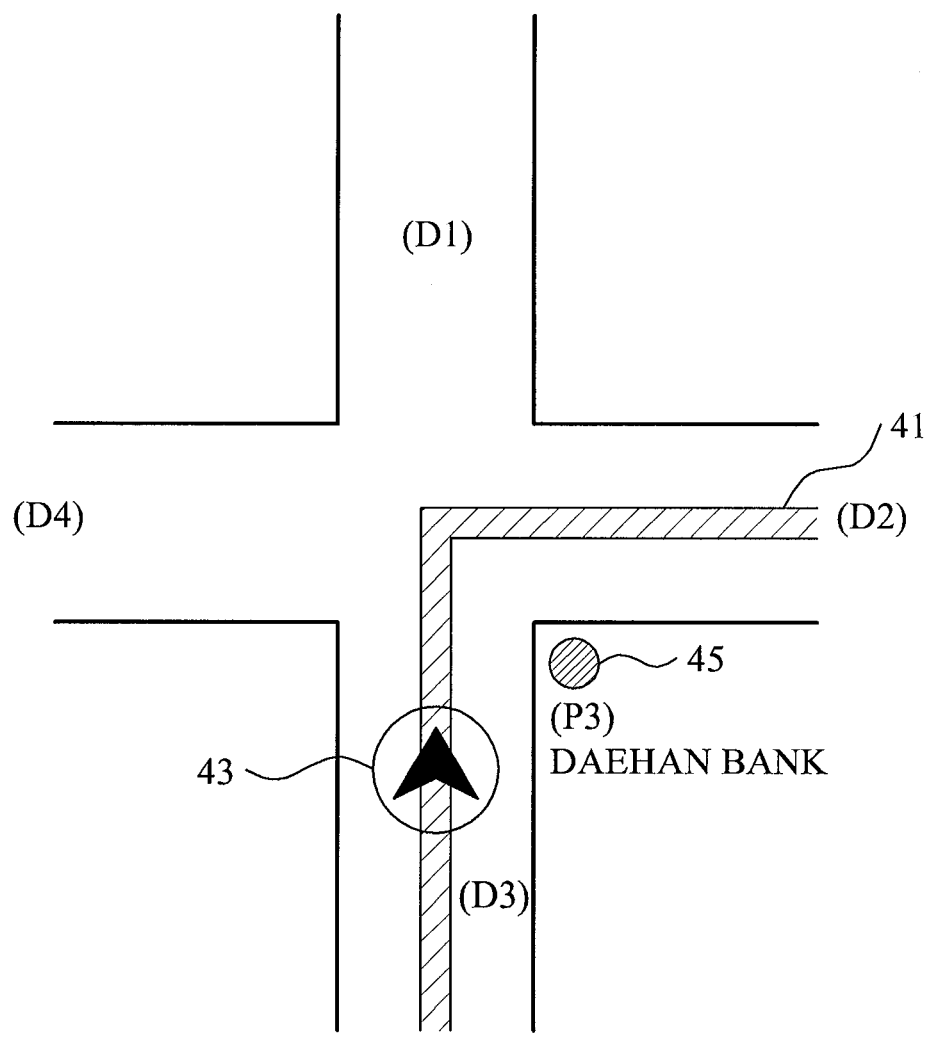
FIG. 4 is a diagram illustrating an example of a turning direction corresponding to a route and a representation POI corresponding to the turning direction with respect to turn guidance in an intersection according to an embodiment of the present invention.

FIG. 4 is a diagram illustrating an example of a turning direction corresponding to a route and representation POI corresponding to the turning direction with respect to turn guidance in an intersection according to an embodiment of the present invention.

As illustrated, when it is assumed that a route 41 to a destination includes a route from a road D3 to a road D2, a turning direction in an intersection corresponding to the route 41 is determined when the intersection is sensed.

Also, an exit point D3 and entry point D2 corresponding to the driving direction may be determined based on information about the intersection stored in an intersection database. A representation POI P3 45 corresponding to the determined exit point D3 and entry point D2 may be read.

A driving direction 43 from the exit point D3 to the entry point D2 is displayed to enable a user to drive according to the route 41. Also, voice guidance about the read representation POI P3 45, for example, "turn right at Daehan bank about 500 m ahead.", is provided. Accordingly, the turn guidance in the intersection may be provided.

Thus, the turn guidance in the intersection may be provided using a representation POI corresponding to a turning direction based on information stored in an intersection database when the intersection is sensed.

The above-described embodiment of the present invention may be recorded in computer-readable media including program instructions to implement various operations embodied by a computer. The media may also include, alone or in combination with the program instructions, data files, data structures, and the like. The media and program instructions may be those specially designed and constructed for the purposes of the present invention, or they may be of the kind well-known and available to those having skill in the computer software arts. Examples of computer-readable media include magnetic media such as hard disks, floppy disks, and magnetic tape; optical media such as CD ROM disks and DVD; magneto-optical media such as floptical disks; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations of the above-described embodiments of the present invention.

According to an embodiment of the present invention, an intersection guidance method using POI information and a navigation system provides guidance about a turning direction in an intersection using information about a POI located around the intersection, and thus more reliable and improved guidance may be provided.

Also, according to an embodiment of the present invention, an intersection guidance method using POI information and a navigation system provides guidance about a turn in an intersection and provides a user with POI information which may be real life information to the user, and thus prevent the user from confusing an entry or turn in the intersection and provide a more safe driving environment.

Although a few embodiments of the present invention have been shown and described, the present invention is not limited to the described embodiments. Instead, it would be appreciated by those skilled in the art that changes may be made to these embodiments without departing from the principles and spirit of the invention, the scope of which is defined by the claims and their equivalents.

The invention claimed is:

1. An intersection guidance method performed by an apparatus using Point of Interest (POI) information, the intersection guidance method comprising:

retrieving a route to a destination set by a user and providing guidance about the route;

providing, when an intersection is sensed on the route, guidance about a turning direction in the intersection, wherein the providing provides guidance about the turning direction in the intersection using representation POI information of the intersection based on a turning direction of the intersection stored in an intersection database, wherein an ID table of the intersection database includes an ID of the intersection, a plurality of possible turning directions for the intersection, exit points and entry points and representation POIs, wherein a representation POI for a first turning direction from a first road to a second road is set differently from a representation POI for a second turning direction from the second road to the first road.

2. The intersection guidance method performed by an apparatus of claim 1, wherein the providing guidance about the turn comprises:

determining an exit point and entry point of the intersection corresponding to the route;

generating guidance information using a surrounding POI existing between the determined exit point and entry point; and providing the generated guidance information and providing guidance about the turn in the intersection.

3. The intersection guidance method performed by an apparatus of claim 2, further comprising:

collecting a surrounding POI for each intersection with respect to a national map and establishing a database, wherein the guidance information is generated from the database.

4. The intersection guidance method performed by an apparatus of claim 3, wherein the establishing comprises:

providing each intersection in the national map with an identification (ID) for each intersection;

setting a possible exit point and entry point of each of the intersections;

designating a representation POI of surrounding POIs of each of the set exit points and entry points, and providing the designated representation POI with an ID; and establishing a database including the ID for each intersection, exit point, entry point, and ID for each representation POI.

5. The intersection guidance method performed by an apparatus of claim 4, wherein the exit point and entry point are designated based on each possible turning direction and are included in the database, the turning direction being defined for each intersection.

6. The intersection guidance method performed by an apparatus of claim 5, wherein the turning direction is a driving course for each intersection where the user may drive under traffic regulations, and includes at least one of a left turn, a right turn, a U-turn, a P-turn, and a circular turn.

7. The intersection guidance method performed by an apparatus of claim 4, wherein the representation POI is a particular POI of surrounding POIs for each exit point and entry point of each of the intersections, the surrounding POIs existing between the exit point and entry point.

8. The intersection guidance method performed by an apparatus of claim 4, wherein, when the database is updated, the ID for each intersection, exit point, entry point, and ID for each representation POI, included in the database, change.

9. The intersection guidance method performed by an apparatus of claim 4, wherein the providing guidance about the turn in the intersection displays the representation POI differently from other representation POIs on the route to enable the user to drive by referring to the representation POI.

10. The intersection guidance method performed by an apparatus of claim 4, wherein the providing guidance about the turn in the intersection provides voice guidance about the turn in the intersection based on the representation POI to enable the user to drive by referring to the representation POI.

11. The intersection guidance method performed by an apparatus of claim 2, wherein the determining of the exit point and entry point recognizes a turning direction on the intersection based on the route, and determines a point corresponding to a start point of the turning direction as the exit point and a point corresponding to an end point of the turning direction as the entry point.

12. A non-transitory computer-readable recording medium storing a program for implementing the method, the method comprising:

retrieving a route to a destination set by a user and providing guidance about the route;

providing, when an intersection is sensed on the route, guidance about a turning direction in the intersection, wherein the providing provides guidance about the turning direction in the intersection using representation POI information of the intersection based on a turning direction of the intersection stored in an intersection database, wherein an ID table of the intersection database includes an ID of the intersection, a plurality of possible turning direction for the intersection, exit points and entry points and representation POIs, wherein a representation POI for a first turning direction from a first road to a second road is set differently from a representation POI for a second turning direction from the second road to the first road.

13. A navigation system, comprising:

a database including an ID of an intersection, a plurality of possible turning directions for the intersection, exit points and entry points and representation POI; and a control unit, when an intersection is sensed on a route set by a user, providing guidance about a turning direction in the intersection using representation POI information of the intersection based on the turning direction of the intersection stored in the database, wherein a representation POI for first turning direction from a first road to a second road is set differently from representation POI for a second turning direction from the second road to the first road.

* * * * *